(12) United States Patent
Binns

(10) Patent No.: US 7,590,063 B2
(45) Date of Patent: Sep. 15, 2009

(54) REAL-TIME ESTIMATION OF EVENT-DRIVEN TRAFFIC LATENCY DISTRIBUTIONS WHEN LAYERED ON STATIC SCHEDULES

(75) Inventor: Pamela A. Binns, Saint Paul, MN (US)

(73) Assignee: Honeywell International Inc., Morristown, NJ (US)

( * ) Notice: Subject to any disclaimer, the term of this patent is extended or adjusted under 35 U.S.C. 154(b) by 1028 days.

(21) Appl. No.: 10/705,802

(22) Filed: Nov. 10, 2003

(65) Prior Publication Data

US 2005/0102413 A1     May 12, 2005

(51) Int. Cl.
*H04L 12/26* (2006.01)
(52) U.S. Cl. .................. 370/232; 370/235; 709/232
(58) Field of Classification Search .............. 370/254, 370/229, 230, 238, 253, 428, 429, 232, 235
See application file for complete search history.

(56) References Cited

U.S. PATENT DOCUMENTS

| | | | |
|---|---|---|---|
| 5,327,428 A * | 7/1994 | Van As et al. ................ 370/353 |
| 5,375,070 A | 12/1994 | Hershet et al. | |
| 5,568,470 A * | 10/1996 | Ben-Nun et al. ............ 370/238 |
| 5,742,847 A * | 4/1998 | Knoll et al. ................... 710/46 |
| 5,767,785 A | 6/1998 | Goldberg | |
| 6,012,096 A | 1/2000 | Link et al. | |
| 6,035,389 A * | 3/2000 | Grochowski et al. ........ 712/216 |
| 6,038,599 A | 3/2000 | Black et al. | |
| 6,115,390 A | 9/2000 | Chuah | |
| 6,161,009 A | 12/2000 | Skurdal | |
| 6,182,125 B1 | 1/2001 | Borella et al. | |
| 6,332,178 B1 | 12/2001 | Dean et al. | |
| 2001/0021197 A1 | 9/2001 | Foore et al. | |
| 2001/0052016 A1 | 12/2001 | Skene et al. | |
| 2003/0233445 A1* | 12/2003 | Levy et al. .................. 709/224 |

OTHER PUBLICATIONS

Thesis, Oct. 1, 2000, Pamela A. Binns.
Aperiodic Response Time Distributions in Queues With Deadline Guarantees for Periodic Tasks.
Thesis submitted to Graduate School University of Minnesota In Oct. 2000.

* cited by examiner

*Primary Examiner*—Ricky Ngo
*Assistant Examiner*—Ben H Liu
(74) *Attorney, Agent, or Firm*—Fogg & Powers LLC

(57) ABSTRACT

A technique for binning aperiodic latency sample data using a data representation called latency band graphs. A fluid flow analysis produces a small, fixed size set of automatically generated bins dependent only on the timeline defined by periodic traffic. The compact number of bins yields a parameterized latency representation suitable for real-time estimation and goodness-of-fit tests.

11 Claims, 10 Drawing Sheets

REAL-TIME ESTIMATION OF EVENT-DRIVEN TRAFFIC LATENCY DISTRIBUTIONS WHEN LAYERED ON STATIC SCHEDULES

This invention was made with Government support under the terms of contract DAAH01-00-C-R226 awarded by U.S. Army Redstone. The Government has certain rights in the invention.

FIELD OF THE INVENTION

The present invention relates to simultaneous scheduling random or aperiodic messages and periodic transmissions on common hardware. More particularly, the invention relates to transmission of periodic transmissions that are regarded as flight critical and have predefined, static transmission times, whereas the non-critical applications are transmitted in the time remaining.

BACKGROUND OF THE INVENTION

Distribution control systems must support both periodic functions and aperiodic functions that send and receive data over one or more common data buses. Sending messages on a common data bus or scheduling tasks on a common processor are canonical examples. To ensure guaranteed latencies, that is, network delays, for closed loop periodic control functions such as sensor read, control, actuator write, and the like, static scheduling techniques are presently used to produce a timeline where known data are transmitted at predefined times, leaving a sequence of gaps for aperiodic message transmission.

There are currently no scheduling models that allow efficient platforms to be built that predictably support both types of applications. For critical aperiodic functions, such as event-triggered ones, with deadline requirements, such as pilot input, target tracking, alarm signals and the like, sufficient bandwidth to allow for worst case event arrival is statically reserved. This results in an over-engineered system and recurring hardware costs. For non-critical aperiodic functions such as internet connections, voice or video, for example, system design has heretofore been by trial-and-error. There has been no way to predict aperiodic message latencies.

The very broad concept of latency measurements in a communication system is taught Link et al. U.S. Pat. No. 6,012,096 relates to a method for network latency in which data packets are transmitted between the users. Skurdal et al. U.S. Pat. No. 6,161,009 uses a control circuit to turn a transmitter on and off, measuring the latency time and using the data in subsequent transmission of data.

Dean et al. U.S. Pat. No. 6,332,178 discloses a method for estimating statistics of properties of transactions processed by a memory sub-system of a computer system. This broadly discloses statistical sampling. Goldberg U.S. Pat. No. 5,767,785 discloses a different method for generating prediction recommendations for signals. Grochowski et al. U.S. Pat. No. 6,035,389 teaches a latency vector system using a register latency table. Borella et al U.S. Pat. No. 6,182,125 discloses a determined network latency method. Hershey et al. U.S. Pat. No. 5,375,070, Chuah U.S. Pat. No. 6,115,390, Black et al. U.S. Pat. No. 6,038,599, Foore et al. Publication 2001/002119, and Skene et al. Publication 2001/0052016 are other patents that are generally related to network latency.

The general problem of estimating aperiodic latencies in complex systems is enormously difficult, especially for multi-class traffic, which, without special restrictions, is not well understood. A first area of concern are those in which steady state approximations can be made, without estimations for transient behavior.

A mathematical analysis of aperiodic message latency distributions is rarely tractable, so it must be estimated using empirical data. For estimating latency distributions, one approach is to construct an empirical distribution function (EDF) using (simulation) data. Another approach is to construct an (approximate) analytic model which would be solved numerically. In the former, PDF's are constructed using a sample of k independent and identically distributed (iid) latency values, $\{x_1, x_2, \ldots, x_k\}$. A typical value for k is 500 or more, which is difficult to process but which is necessary to get an appropriate set of values.

It would be of great advantage in the art if a greater understanding of steady state approximations of latencies could be achieved.

It would be another great advance in the art if a sampling point strategy could be devised that would produce a compact estimate of aperiodic latency distribution.

Other advantages will appear hereinafter.

SUMMARY OF THE INVENTION

It has now been discovered that the above and other objects of the present invention may be accomplished in the following manner. Specifically, the present invention includes a new technique for binning aperiodic latency sample data, or defining cluster regions for latency data. The invention employs latency band graphs to which fluid flow analysis is applied, leading to a small, fixed set of automatically generated bins that depends only on the periodic message traffic. The small and deterministic number of bins yields a compact latency estimation representation suitable for use in real-time on actual data, and provides good latency estimates under a broad range of conditions.

It has been discovered that patterns in the size and spacing of gaps in the periodic timeline introduce event latency bands that can have significant effects on the shape of the latency distribution.

BRIEF DESCRIPTION OF THE DRAWINGS

For a more complete understanding of the invention, reference is hereby made to the drawings, in which.

DETAILED DESCRIPTION OF THE PREFERRED EMBODIMENT

The present invention is admirable suited to manage data to ensure guaranteed deadlines for critical closed loop periodic control functions and other related functions. In order to describe the invention, the following definitions are used.

| VARIABLE | DESCRIPTION |
| --- | --- |
| m | number of message blocking times in a frame (hyperperiod) |
| $b_j$ | by start time (relative to frame start) of the $j^{th}$ periodic message streams blocking time. Multiple aperiodic messages can be sent in a single blocking duration |
| $g_j$ | start time (relative to frame start) of the $j^{th}$ aperiodic transmission gap. Multiple aperiodic messages can be sent in a single gap. |
| $block_j$ | the duration of the $j^{th}$ block. $block_j = g_j - b_j$. |
| $gap_j$ | the duration of the $j^{th}$ gap. $gap_j = b_{j+1} - g_j$. |
| H | hyperperiod or (major) frame duration. $$H = \sum_{j=1}^{m}(block_j + gap_j)$$ |
| BI | the busy/idle vector, defining the transition times (relative to frame start) from busy to idle intervals and from idle to busy intervals. $BI = [0 = b_1, i_1, \ldots, b_m, i_m, b_{m+1} = H]$. |
| C | time reserved in a frame for transmitting periodic messages. $$C = \sum_{j=1}^{m} block_j.$$ |
| $\lambda$ | mean interarrival rate for aperiodic task arrivals. $\lambda^{-1}$ is the mean time between arrivals for aperiodic message arrivals. |
| $\mu$ | mean service rate for aperiodic messages. $\mu^{-1}$ is the average aperiodic message transmission time. |
| $\rho_1$ | periodic message utilization in a frame. $\rho_1 = C/H$ |
| $\rho_2$ | average aperiodic message utilization $\rho_2 = \mu/\mu$ |
| $\mu$ | degraded service rate of an aperiodic task when factoring in transmission time not available due to periodic blocking times. $\mu = \mu(1 - \rho_1)$. |
| $\epsilon(\lambda)$ | a shorthand for the exponential distribution with parameter $\gamma$. If $Z \sim \epsilon(\gamma)$, then $Pr[Z \leq z] = 1 - e^{-\gamma z}$, $E(Z) = \gamma^{-1}$, $Var[Z] = -2$. |
| U(2/y) | a shorthand for the uniform distribution on $[0, 2/y]$. For $Z \sim U[0, 2/\gamma]$, then $E[Z] = \gamma^{-1}$, $Var[Z] = (3\gamma^2)^{-1}$. |
| R | true theoretical aperiodic latency distribution in the absence of periodic traffic. Generally R is unknown. In some simulated data, an M/M/1 queue is used, in which case $R(x) = 1 - e^{-(\mu-\lambda)x}$ |
| $d_{max}$ | maximum latency value for which a probability estimate will be made. $d_{max}$ is finite but arbitrary, and defined by system requirements. |
| $R_{dsm}$ | degraded server latency model for aperiodics. Under conditions of heavy traffic, $R_{dsm}$ is well approximated by the heavy traffic queuing models, but heavy traffic conditions often don't apply in to, e critical systems. |

Figure 1:
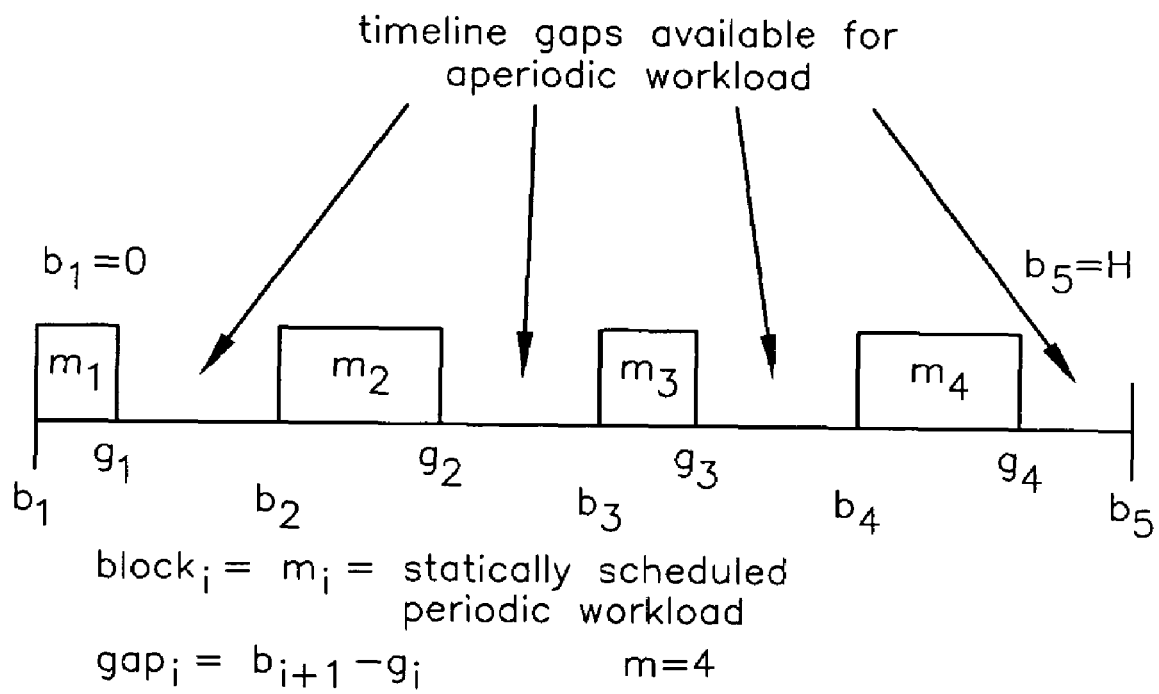
FIG. 1 illustrates timeline gaps that are available for aperiodic message transmission between times for statistically scheduled real-time messages.

The m periodic message durations have blocking times $m_1$, $m_2$, ..., $m_m$. In FIG. 1, the $i^{th}$ blocking interval $m_i$ begins at time $b_i$ relative to frame start where $b_1=0$ and $b_{m+1}=H$. The hyperperiod (or frame) H is the smallest time it takes for the periodic message transmission cycle to repeat. Blocking (busy) intervals alternate with gaps (idle intervals). In FIG. 1, the $i^{th}$ gap, $gap_i$ starts time at time $g_i$ and has duration $b_{i+1}-g_i$. A periodic busy-idle interval vector BI is defined by the transition points between busy and idle intervals. Aperiodic messages are transmitted in fifo (first-in-first-out) order and have no deadlines. A gap is (partially) empty only if there is no waiting aperiodic message ready to be sent. Incomplete aperiodic transmissions resume transmission at the next available gap, assumed in the model without any preemption overhead.

The interarrival times between adjacent aperiodic message arrives are iid with distribution A, mean $\lambda^{-1}$ and finite variance. In symbols, $Pr(\alpha_{n+1}-\alpha_n \leq t)=A(t)$. Aperiodic message times are iid with distribution B, mean $\mu^{-1}$ and finite variance. In symbols, $Pr(x_n \leq x)=B(x)$. Total system utilization is $\rho=\rho_1$, $\rho_2<1$. The maximum delay beyond which there is no utility is denoted by $d_{max}$ which can be arbitrarily large and is system dependent.

In its simplest form, the invention generates a set of points or bins, collects and categorizes a large number actual data points, and places the categorized points in the generated bins. Thus, instead of 500 or more data points, the present invention considers only a small number, often less than 12.

It is helpful to use a single simple reference model to provide qualitative and intuitive comparisons between observed system behaviors and expected behaviors for a proportionally shared server. Aperiodic traffic streams can have either exponential interarrival and service times, as in the equation $\alpha_{n+1}-\alpha_n \sim \epsilon(\lambda)$ and $x_n \sim \epsilon(\mu)$, or uniform interarrival and service times as in the equation $\alpha_{n+1}-\alpha_n \sim U[0, 2\lambda^{-1}]$ and $x_n \sim U[0, 2\mu^{-1}]$. These equations may also be referred to as M/M/1 and U/U/1 models, and for both models, mean interarrival and service time are $\lambda^{-1}$ ms and $\mu^{-1}=1$ ms, respectively. The single simple reference model used herein is called a degraded server model or DSM. The DSM degrades service rate by the proportion of time capacity is not available for aperiodic message transmission, or $1-\rho_1$. The DSM is not restricted to conditions of heavy traffic, but requires knowledge of the aperiodic-only traffic latency distribution. For a background M/M/1 aperiodic message queue, the DSM is P [aperiodic latency R is less than $t$]=$P(R \leq t)=R_{dsm}(t)=1-e^{-(\mu-\lambda)t}$, where $\mu=(1-\rho_1)\mu$ is the degraded service rate. Since the U/U/1 limiting distribution has no closed form, this same equation is used for that situation.

Figure 2:
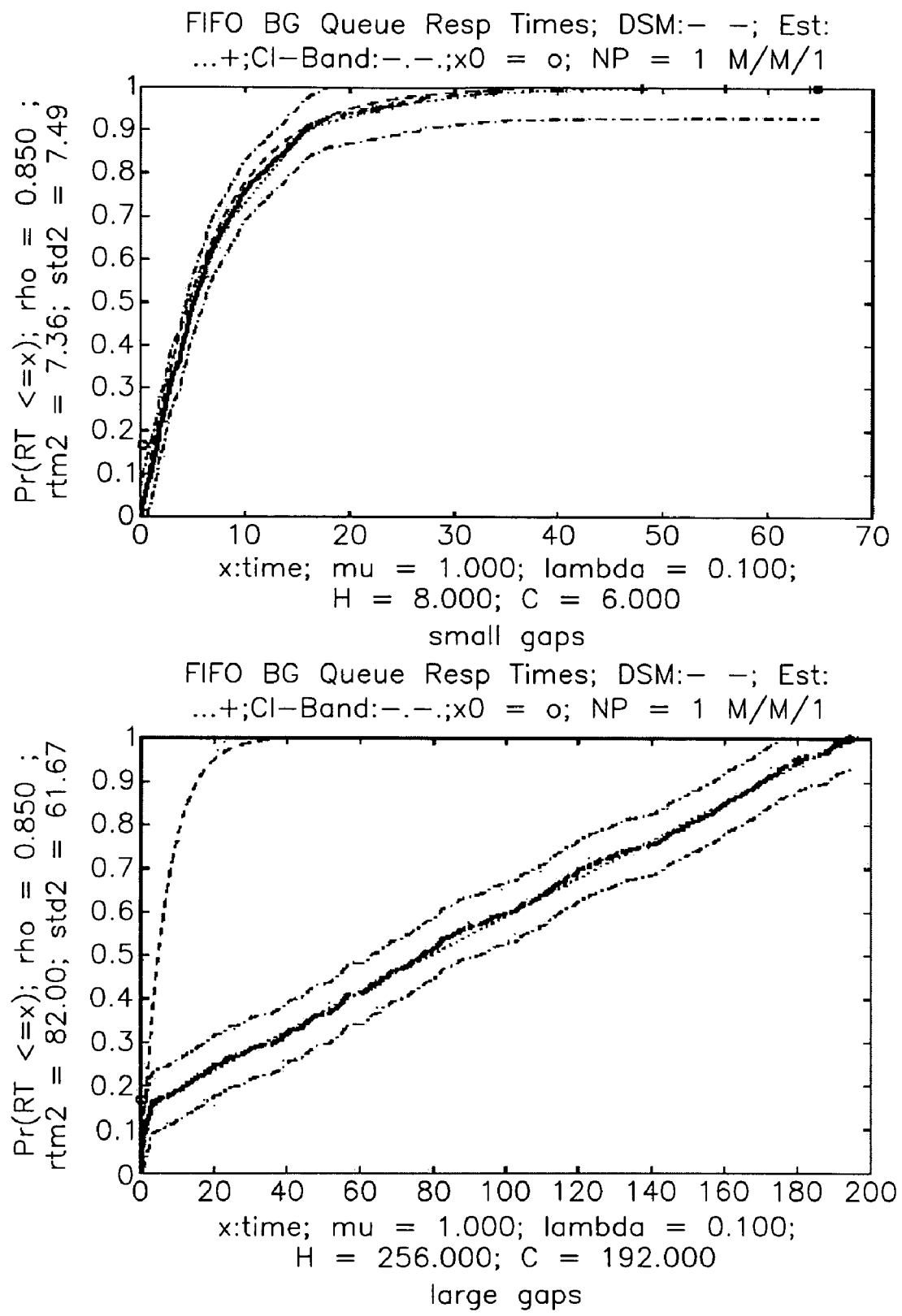
FIG. 2 is a pair of graphs showing latency band examples.

The latency distribution graphs shown in FIGS. 2a and 2b has time on the x-axis and Pr [aperiodic latency$\leq$x] on the y-axis. The true latency distribution function is approximated using the empirical distribution function, which is the dark (heavy dotted and wavy) line. For the data shown in FIGS. 2a and 2b, k=500, and $\epsilon$=0.07, making $\eta=1-\delta \geq 0.98$. On the latency distribution plots the two-sided confidence band with accuracy 0.07 at level $\eta \geq 0.98$ is shown by the dot-dash line. The reference model described above may be overlaid on the empirical latency curves for comparative purposes, shown as a dash-dash line.

The latency band graph of FIGS. 2a and 2b has the message arrival time modulo the hyperperiod as its x-axis and observed message latencies as its y-axis. These plots are called "latency band graphs" because aperiodic message latencies conditioned on arrive time within the hyperperiod will only fall in a predefined set of bands due to the blocking structure introduced by periodic message transmission.

For a given periodic timeline BI, latency bands are constructed as follows. The x-axis runs from 0 to H and the y-axis run from 0 to $d_{max}$. Lines with slope -1 are drawn from y-axis points in k·BI to x-axis points in k·BI Aperiodic latencies will only fall in the bands corresponding to gaps. In the latency bands shown in FIGS. 3a and 3b, BI=[0, 44, 48, 52, 64]. The band structure on FIG. 3a and on FIG. 3b are the same. In the FIG. 3b band graph aperiodic messages arrive at a higher rate, hence delays are longer and more bands are shown.

Aperiodic work is discharged in idle intervals if it backlogs and accumulates in periodic busy intervals. The flow dynamics of the aperiodic message queue are likely to change and busy/idle transition points. These transition points are likely to correspond to points of inflection in the latency distribution. Inclusion of points in BI is the first step in generating binning points.

For a given latency range, the band structure gives some insight into arrival times. There are confounding arrival conditions for aperiodic latencies among neighboring bands. Even though the arrival times are not controlled, when conditioning on arrival time, the set of possible latency values changes. For example, if an aperiodic message latency falls between 52 and 64, then either the arrival time of the message occurred in the interval [0, 12] or [48, 64], and at no other time within the hyperperiod. Intervals [0, 12] and [48, 64] are band confounding regions for latencies in the range [52, 64]. Approximating confounding regions for bands is the second phase of bin point generation. In the latency band graph, the busy/idle interval backlog/discharge is seen along the y-axis as a function of the arrival time modulo the hyperperiod of a queued message. Points identifying confounding region boundaries might be points of inflection in a latency distribution, since within the confounding regions there are multiple conditions leading to the observed dynamics, at least one of which changes when exiting the region.

Bin generation consists of two phases. Let S be a set of binning points. Initialize $S=\{b_1, g_1, b_2, g_2, \ldots, b_m, g_m\} \cup \{H\}$. S is a set rather than a vector, so duplicate values can conveniently be ignored. The initial set of binning points is directly associated with abrupt changes in the stochastic flow of aperiodic message transmission. During a busy interval arriving aperiodic messages queue and are blocked. In an aperiodic gap, any queued backlog discharges at rate $\mu$ until the queue empties or is blocked. If the idle interval is long enough for the backlog to fully discharge, there is an idle interval following the aperiodic message transmission interval.

Figure 4:
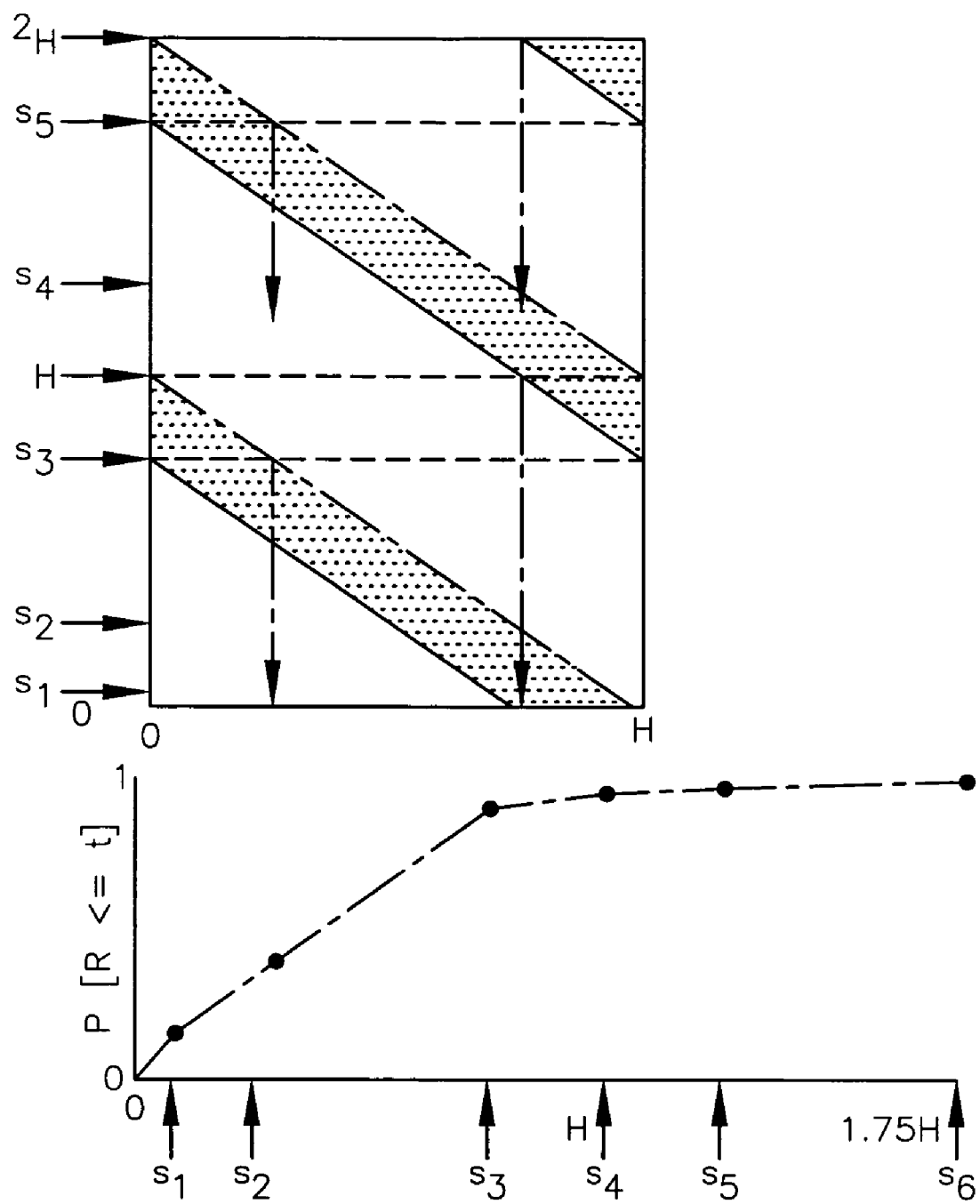
FIG. 4 is a pair of graphs showing binning points on latency bands and EDF.

Further binning points are needed to group latencies in bands with confounding regions. Computing these separating points is done with a set of linear equations. FIGS. 4a and 4b illustrate how the complete sample set S is constructed when starting with points in BI. In FIGS. 4a and 4b, $\rho_1=0.74$ and $BI=H \cdot [0.0, 0.75, 1.0]$. The binning point generation algorithm is applied to BI shown in FIGS. 4a and 4b.

Initialize $S=BI=\{0.75H, H\}$. For each point $s_j \in S$ define a line $L_j$ with slope −1. $L_j$: $y=(s_j-x)$ mod H where $L_j(s=(s_j-s)$ mod H. Next, construct $S^*=\{L_j(s)|s \in S\}$. For example, in FIGS. 5a and 5b, $S^*=\{0, 0.25H, 0.75H, H\}$.

Let $S=\{s: s \in S\} \cup \{H\}$. In FIGS. 5a and 5b, $S=0, 0.25H, 0.75H, H\}$ adding only one new binning point. Duplicates occur whenever $s \in S$ is a linear combination of elements in $S-\{s\}$. To simplify notation, suppose S is rank ordered in the sense that $0=s_1<s_2<\ldots<s_l=H$.

Then let $x_{max}$ be a value beyond which the application does not benefit or is otherwise not interesting. Then set $n_h=\lceil x_{max} \cdot H^{-1} \rceil$. In this example, $x_{max}=2H$ and $n_h=2$.

Finally, define $$S = \bigcup_{j=0}^{n_h-1} (j \cdot H + S)$$

with $s_1=s_2/c$ where $j \cdot H+S=\{s+jH|s \in S\}$ and c is a tuning parameter. The substitution of $s_1=0$ by $s_1=s_2/c$ is because $R(0)=0$ and with moderate to light traffic there is often a rapid rise near zero. $s_2/16$ was used but c=8 is also a reasonable choice. The final set of binning points is $S=\{¼·16H, ¼H, ¾H, H, 5/4H, 7/4H, 2H\}$.

By picking BI to contain gap and block durations that are multiples of one another, one can attempt to reduce the final number of binning points. Points in S that are close to one another might be collapsed, either by deleting one or using an average. When $n_h$ is large, such as greater than or equal to 10, and when latencies near $x_{max}$ are observed, the DSM is a reasonable approximation.

Table 2 shows values for BI the busy/idle transition points in a hyperperiod H. $\rho_1$ is the percentage of time per frame reserved for periodic message transmission. Table 2 also shows the actual and maximum sizes of binning point sets. The maximum number of points in the final binning set as shown above is $4m^2$ (since $|BI|=2m$, ignoring H).

TABLE 2

| m | ρ1 | $BI_i = [0 = b_1, i_1 \ldots, b_m, i_m, b_{m+1} = H]$: $BI_f$ = all binning points in a hyperperiod | $BI_f$ | max $|BI_f|$ |
|---|---|---|---|---|
| 1 | 0.75 | $BI_i$ = H[0, 0.75, 1.0]<br>$BI_f$ = H[0, 0.25, 0.75, 1.0] | 4 | 4 |
| 2 | 0.25 | $BI_i$ = H[0, 0.1875, 0.5, 0.5625, 1.0]<br>$BI_f$ = H[0, 0.0625, 0.1875, 0.3125, 0.375, 0.4375, 0.5, 0.5625, 0.625, 0.6875, 0.9375, 1.0] | 12 | 16 |
| 2 | 0.75 | $BI_i$ = H[0, 0.6875, 0.75, 0.8125, 1.0]<br>$BI_f$ = H[0, 0.0625, 0.125, 0.1875, 0.25. 0.3125, 0.6875, 0.75, 0.8125, 0.875, 0.9375, 1.0] | 12 | 16 |
| 4 | 0.25 | $BI_i$ = H[0, 0.14583, 0.25, 0.27083, 0.5, 0.5625, 0.75, 0.77083, 1.0]<br>$BI_f$ = H[0, 0.14583, 0.16, 0.25, 0.27803, 0.3125, 0.375, 0.39583, 0.5, 0.5625, 0.625, 0.64583, 0.75, 0.77083, 0.8125, 0.875, 0.89583, 1.0] | 18 | 64 |

Figure 5:
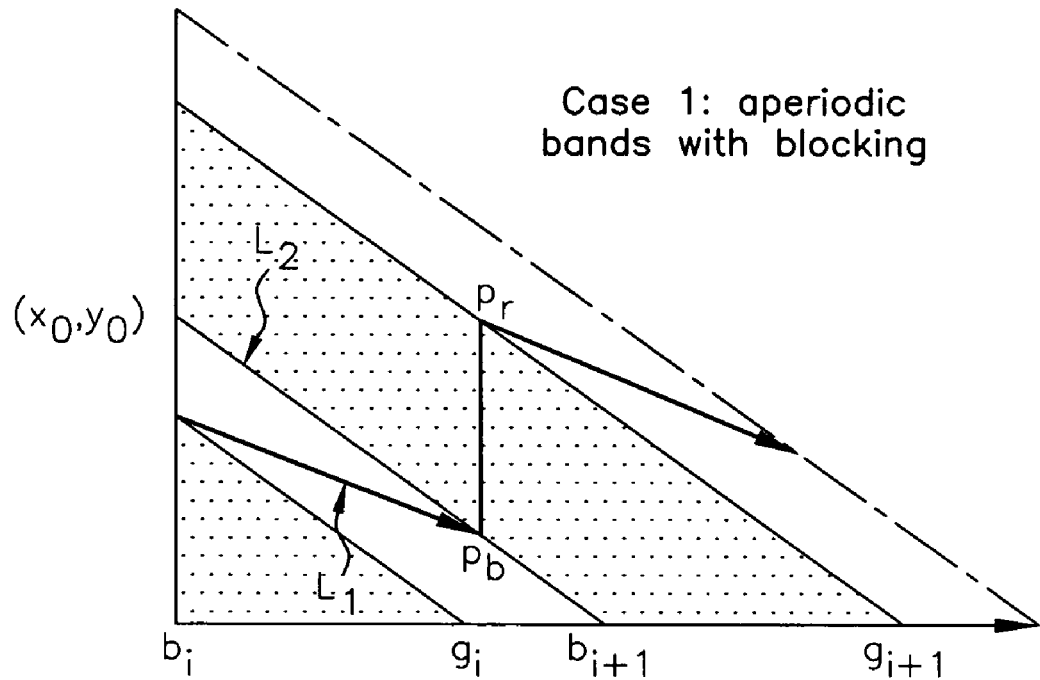
FIG. 5 is a pair of graphs that illustrate blocking and non blocking discharge bands.
Figure 5:
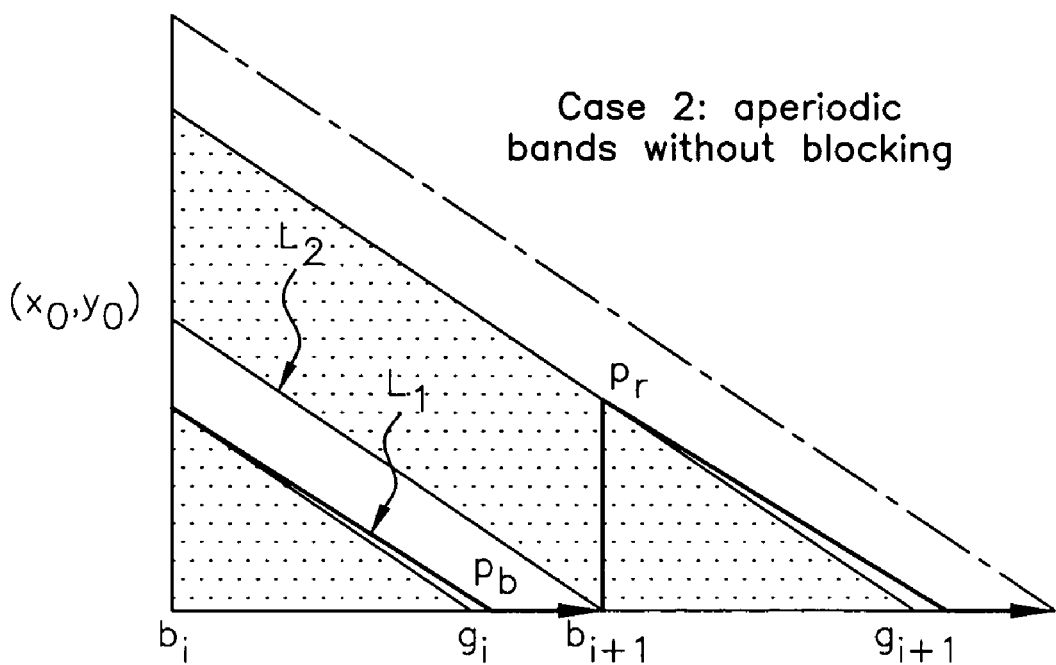

In FIG. 5, discharge flows are shown. The discharge point begins at the point $(x_o, y_o)$. At time $x_o$ the queue contains messages that would take $y_o$ time units to transmit, since $y_o$ is the pending work at time $x_o$.

On the left hand side of FIG. 5, blocking occurs before the queue empties and the backlog empties completely on the right hand side. $L_1$ shows the expected rate at which aperiodic work is emptied from the system. When $\mu=1$, $L_i$ has slope $-(1-\rho_2)$, the difference between the service rate minus the arrival rate. Point $p_b$ is the expected value at which $L_1$ either ends, when blocking occurs, or changes slope to 0 when discharge of the backlog is complete. Point $p_r$ is the next point at which the aperiodic release times are expected to begin again with a backlog.

For latency bands with blocking, point $p_b$ is found at the intersection of the two lines $L_1$ and $L_2$, where $L_1(x)=y=y_o-(1-\rho_2)(x-x_o)$ and $L_2(x)=y-y_o+gap_i-(x-x_o)$, giving $L_1(x_o+gap_i/\rho_2)=L_2(x_o+gap_i/\rho_2)=y_o-((1-\rho_2)/\rho_2)gap_i$.

When $L_1(x_o+gap_i(\rho_2)^{-1}>0$, we have $x_o+y_o+gap_i>x_o+gap_i(\rho_2)^{-1}$ This gives $p_b=(x_o+gap_i/\rho_2, y_o-((1-\rho_2)/\rho_2)$ $gap_i)$. The next release time value $p_r$ is immediately above $p_b$ by an amount $block_{i+1}$ so is given by $$p_r = \left(x_0 + \frac{gap i}{\rho 2}, y_0 + block_{i+1} - \frac{(1-\rho 2)}{\rho 2} gap_i\right).$$

Figure 6:
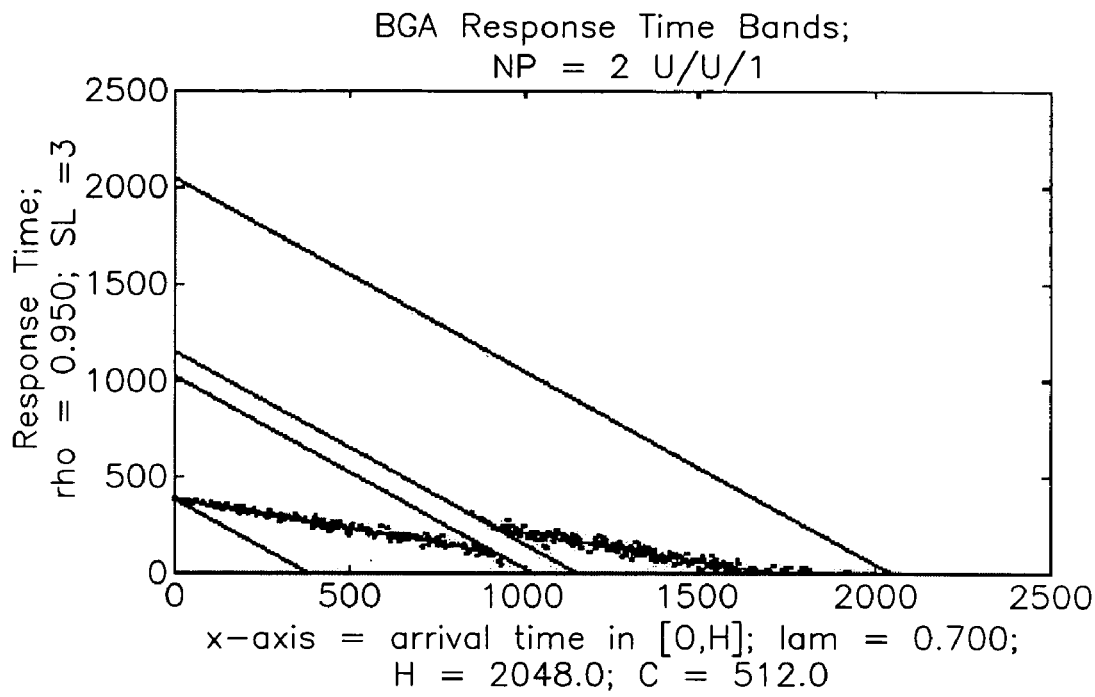
FIG. 6 illustrates RHS: blocking RT Bands and points.
Figure 6:
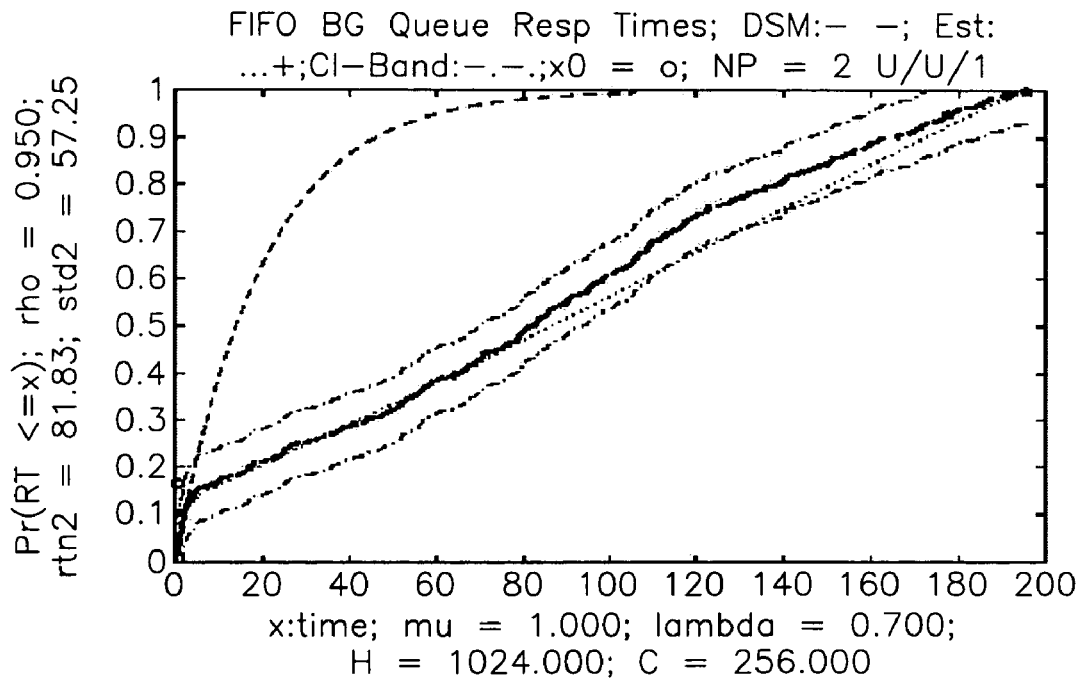

Only when the hyperperiod is suitably long does the fluid flow discharge behavior shown in FIG. 5 accurately capture the system behavior. FIG. 6 gives an example of the above described technique with BI=[0, 128, 384, 1024, 1152, 2048], $\rho_1$=0.25 and $\rho_2$=0.7. Blocking occurs in FIG. 7 only in the leftmost aperiodic transmission band.

When generating the final set of binning points, the values of $\rho_2$ in the equation above defining $L_1$ are essentially set to 0 and 1 for each value of $y_o$ associated with a busy/idle transition instance. When the aperiodic message latencies typically span multiple hyperperiods, a value of $\beta_2$=1 works well for capturing confounding bands. A transient value of $\rho_2$=1 can be seen as an aperiodic message queue that will not significantly decrease in size over a single gap. A number of experiments led to good estimates for the set of binning points described above.

Including additional binning points at the y-values in $p_b$ and $p_r$ (in each of the m aperiodic transmission bands) may be of value when latencies are often less than a single hyperperiod, but some queuing occurs. For example, the y-values in $p_b$ and $p_r$ corresponding to FIG. 6 are 109.71 and 237.71, which makes the estimate less pessimistic. To eliminate dependencies on the value of $\rho_2$, one could use $\rho_2$=1-$\rho_1$. Setting $y_o$ to the mid-point between $L_1$ and $L_2$ (for fixed $x_o$) may also prevent some y-values for $p_b$ from being 0.

When system utilization $\rho$ is low, most all aperiodic message arrivals will have a minimal wait. The right hand side of FIG. 5 shows aperiodic latency bands without blocking. Again, values for $p_b$ and $p_r$ are computed. Lines 1 and 2 are defined as above for $L_1$ and $L_2$. The slope of line 1 is sufficiently large that the intersecting point for lines 1 and 2 lies below the line y=0. The x-coordinate for $p_b$ is found by solving $L_1(x=0. L_1(x_o+y_o/(1-\rho_2))=0$, and consequently $p_b=(x_o+y_o/(1-\rho_2), 0)$.

Figure 7:
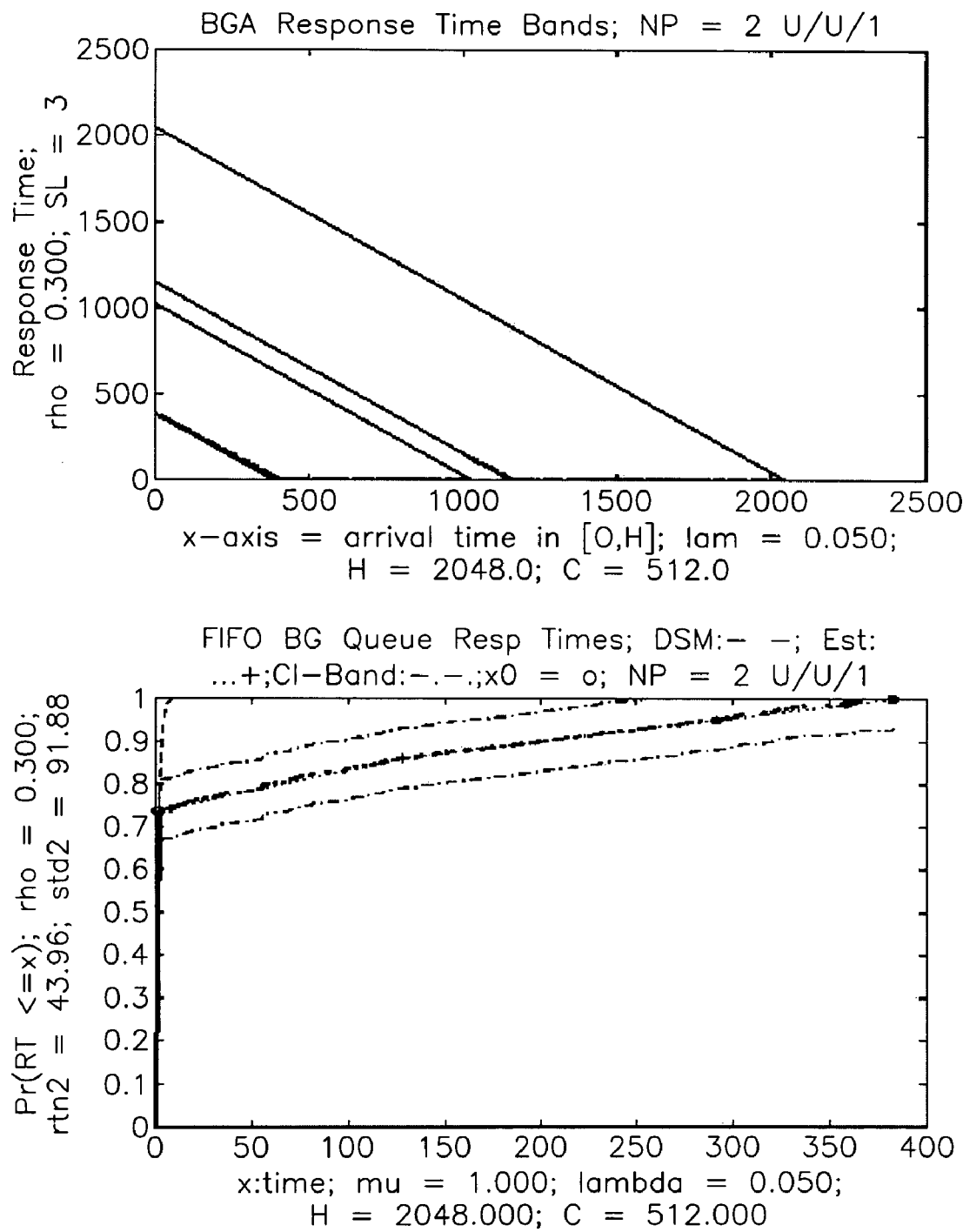
FIG. 7 illustrates RHS non-blocking RT Bands and points.

Unlike when blocking occurs in an aperiodic transmission band, once the aperiodic backlog is discharged it remains in the discharged state until the next periodic blocking band begins. When the periodic blocking band with duration $block_{i+1}$ is encountered, the y-coordinate jumps to the next aperiodic transmission band. So, $p_r=(x_o+y_o+gap_i, block_{i+1})$. Note that the y-values defined for $p_b$ and $p_r$ in the equations immediately above are contained completely in the set of points generated for our latency distribution generation algorithm FIG. 7 shows data illustrating lines 1 and 2 for non-blocking aperiodic latency bands and the corresponding latency EDF. The periodic parameters are the same as in FIG. 7 and $\lambda$=0.05, so $\rho$=0.30. When the hyperperiod is suitably long, such as in FIG. 7, the fluid flow discharge behavior shown in FIG. 5 accurately captures the system behavior and can be used to explicitly compute the latency distribution.

The data shown in the figures has been taken from several dozen simulations that represent a spectrum of operational settings. At one end of the spectrum, the hyperperiods are very long relative to local gaps and blocks. At the other end of the spectrum, the cumulative gap time available in any hyperperiod is small relative to the pending aperiodic work, in which case latency distributions are reasonably well approximated by the equation defining M/M/1 aperiodic queue simulation data.

In summary, the invention comprises the generation of a set of binning points S=($s_1, s_2, \ldots, s_1$) and a compact, latency vector that has fixed size is defined by R(S)=[$p_1, p_2, \ldots, p_1$] where $p_i$=P[latency$\leq S_i$]. Empirical data is used to estimate values for $p_i$ and the results for the proposed binning technique is compared with a traditional empirical distribution function estimate and associated confidence bands. Latency band data is placed near latency distribution data so the impacts of band size, distribution and aperiodic utilization is seen. Samples are spaced far apart in time so the data set is approximately iid.

Figure 8:
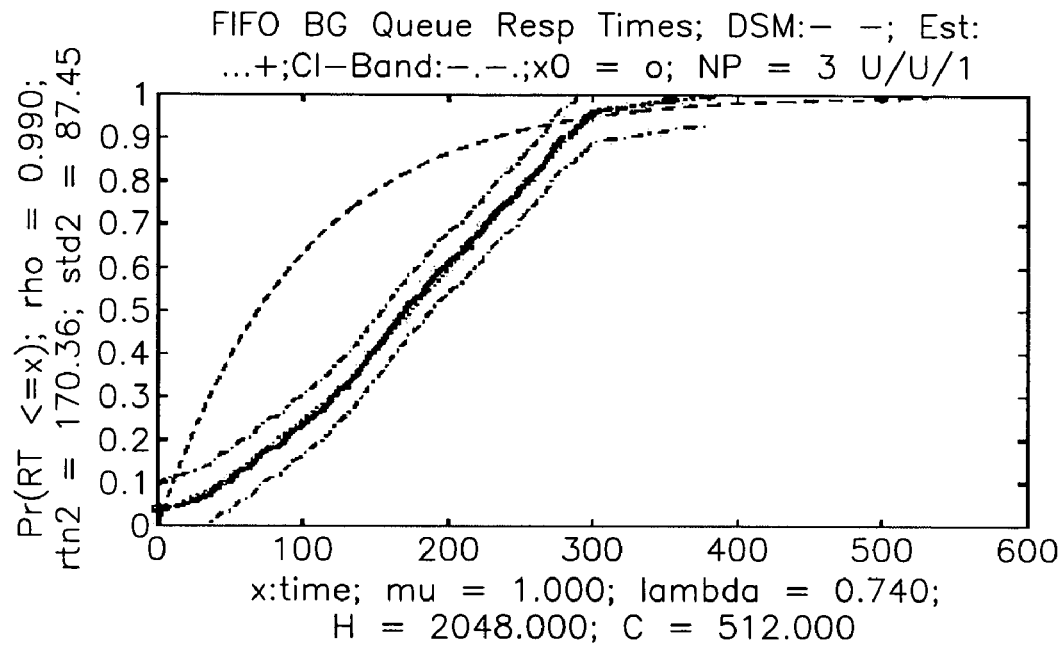
FIG. 8 illustrates latency EDFs.
Figure 8:
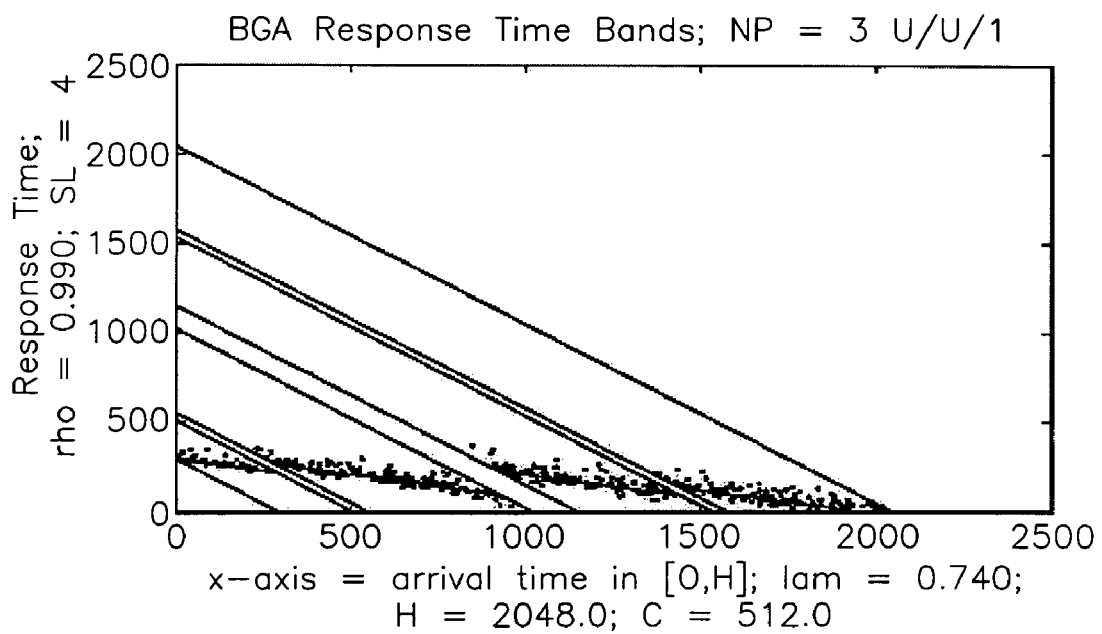

The latency bands in FIG. 8 correspond to the latency distribution based on the observed probabilities shown in the bands on the bottom of FIG. 8. The periodic timeline in FIG. 8 is BI=[0, $298_{2/3}$, 512, $554_{2/3}$, 1024, 1152, 1536, $1578_{2/3}$, 2048]. The observed latencies all fall within a single hyperperiod, with the largest observed latency less than 400. The binning technique produces a fairly accurate latency estimate. There is a visible point of inflection at $298_{2/3}$. The DSM is optimistic compared to the latency estimate. When traffic is heavy, the DSM approximates the M/M/1 HTM, which is pessimistic compared to the U/U/1 HTM. The latter would significantly underestimate observed latencies.

Figure 9:
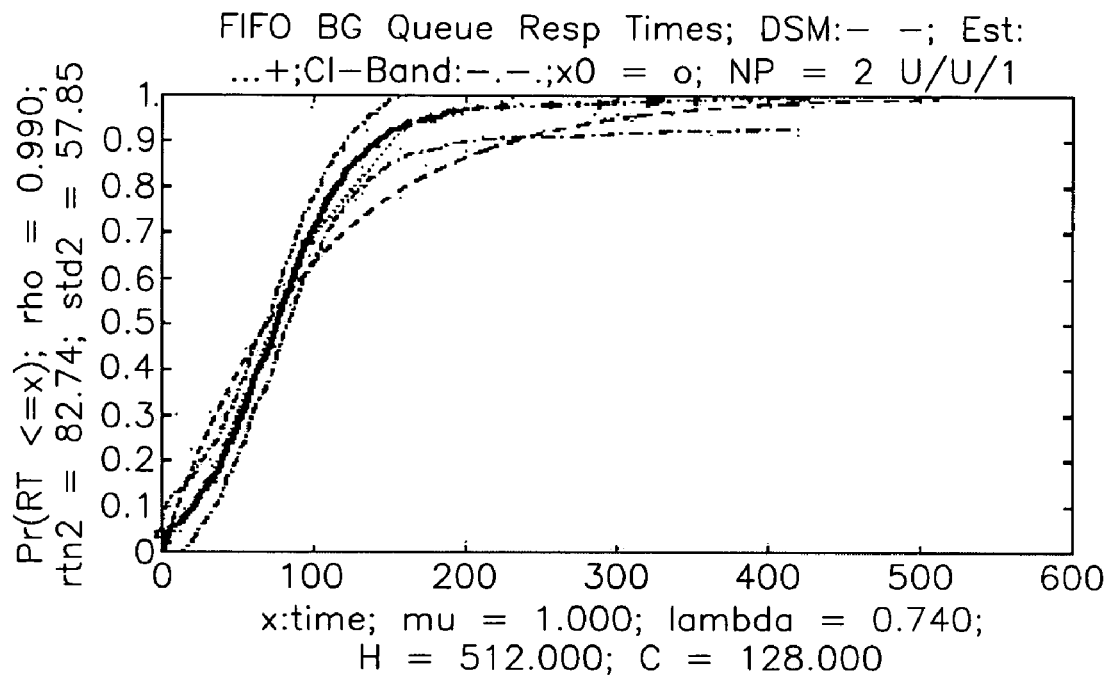
FIG. 9 illustrates other latency EDFs.
Figure 9:
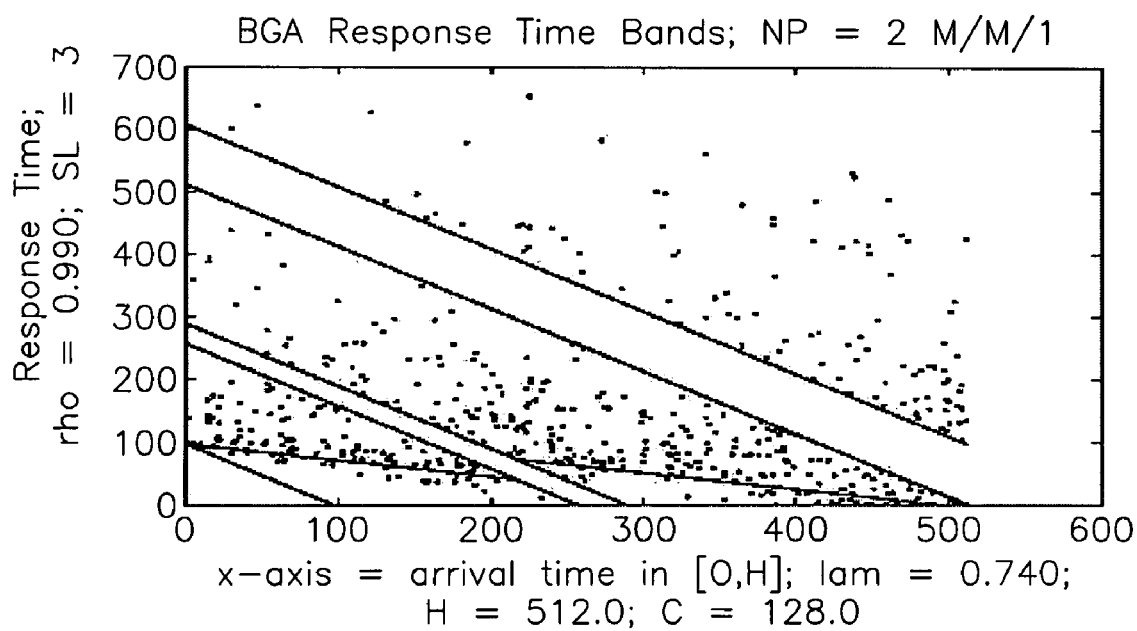

In FIG. 9 $BI_i$=[0, 96, 256, 288, 512] and all latencies are within two hyperperiods. For this configuration, the observed latencies are optimistic compared to the DSM prediction.

Figure 3:
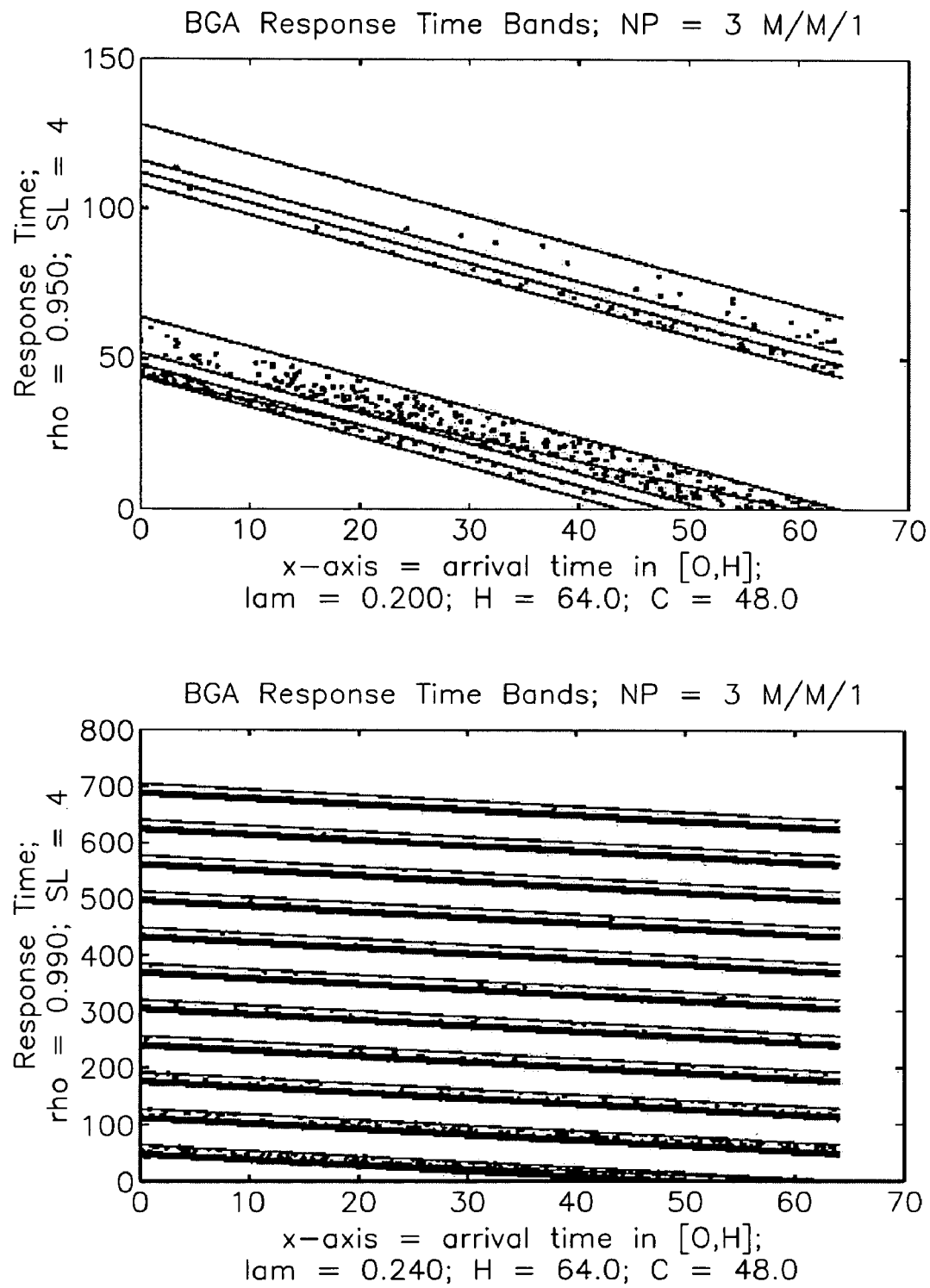
FIG. 3 is a pair of graphs showing latency distribution examples.
Figure 10:
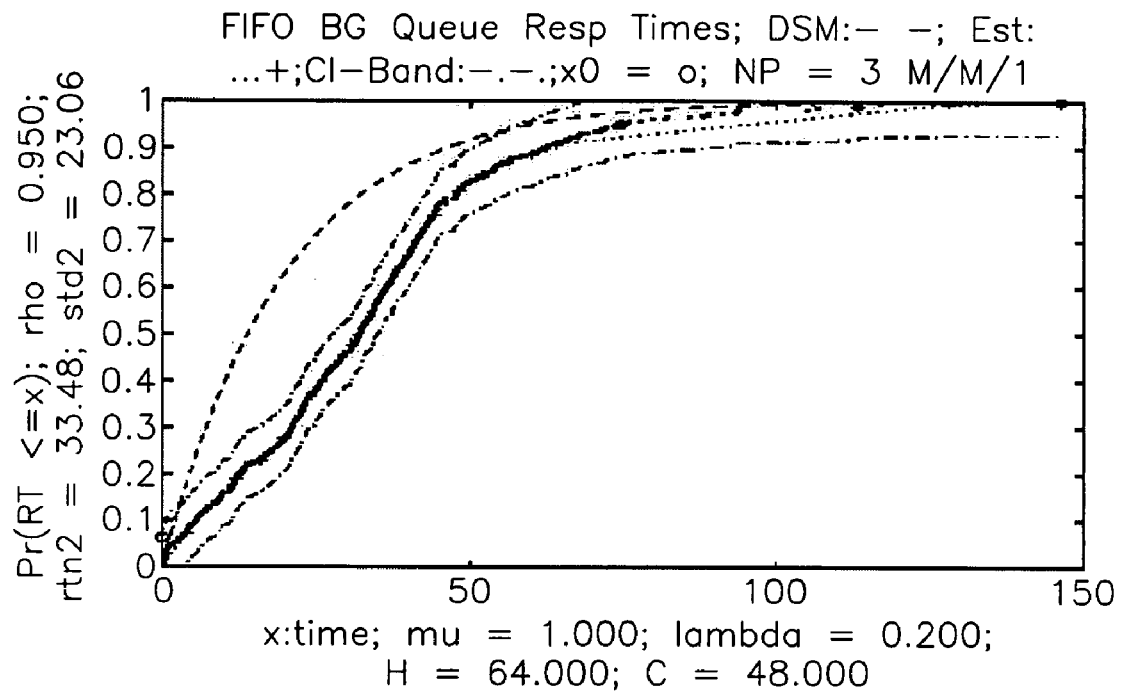
FIG. 10 illustrates latency EDFs for a set of values.
Figure 10:
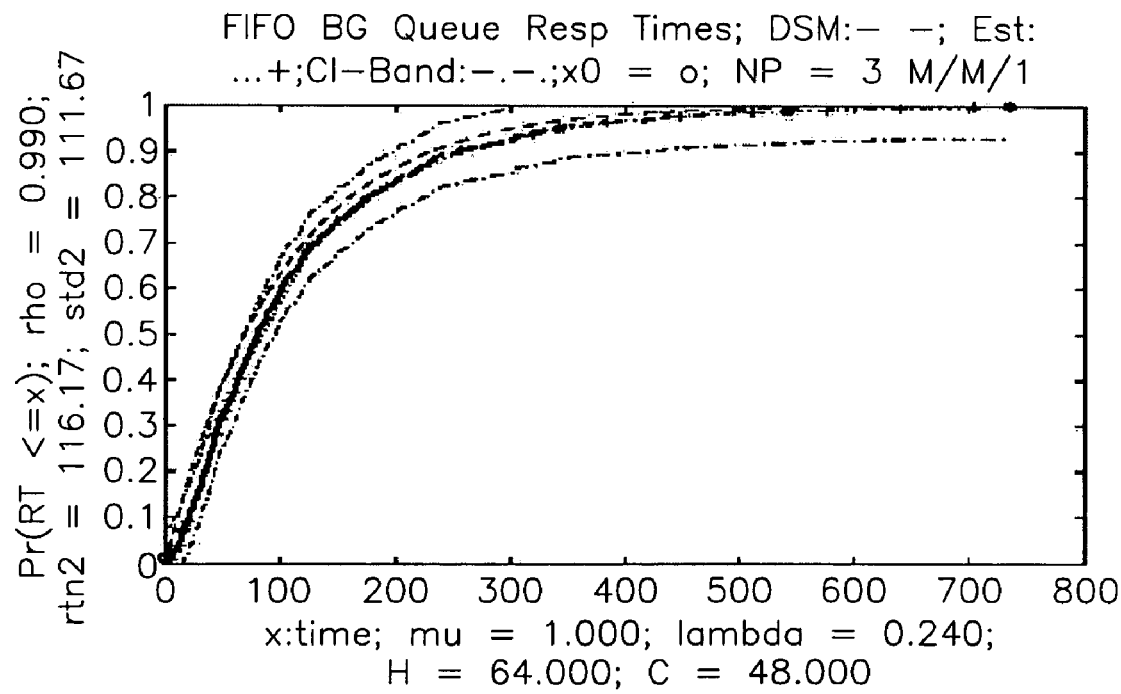

The latency bands corresponding to the latencies in FIG. 10 are found in FIG. 3. The only difference between the top and bottom graphs is an increase in the aperiodic message inter-arrival rate from 0.20 messages/unit time to 0.24 messages/unit time. In the top, latencies span three hyperperiods compared to 11 in the bottom, (where the DSM is a reasonable fit.

There are several benefits from the present invention. The number of bins is compact and deterministic. The number of support points, x-values with non-zero probability, is defined by the number of bins, n, not by the number of sample points k, where often n<<k. In the figures shown herein, k is always 500 and $n_h$ ranges from less than 12 to, in some cases, less than 0.2.

Because the number of bins n depends only on the timeline generated by periodic message transmission, the support points are known so latency values observed on-line can be quickly recorded. There is considerably greater variability in recording times when k is the sample size, compared to when n is used.

While particular embodiments of the present invention have been illustrated and described, it is not intended to limit the invention, except as defined by the following claims.

The invention claimed is:

1. A method for managing data flow in a system with simultaneous scheduling of aperiodic messages and periodic transmissions on a common bus, comprising the steps of:
   (a) using predefined periodic transmission times, calculating data transition points between periodic and aperiodic message transmissions intervals for a hyperperiod of interest in said system;
   (b) using said data transition points to produce a series of aperiodic latency estimation inflection points;
   (c) collecting data points of aperiodic message transmissions for the hyperperiod of interest in said system;
   (d) estimating the aperiodic latency probability at an inflection point in the hyperperiod of interest as being equal to the number of sample data points less than or equal to the said inflection point divided by the total number of collected aperiodic latency sample data points, said data points forming a data point plot that is assumed to be linear between said aperiodic latency inflection points; and
   (e) transmitting the aperiodic messages based, at least in part, on the estimated aperiodic latency probability.

2. The method of claim 1, wherein said data points are plotted on the X axis of a graph and the empirical probability that the latency exceeds the time is plotted on the Y axis of said graph, such that latency estimation inflection points are selected along said X axis for the hyperperiod of interest to visually represent values at which higher priority periodic message traffic will impact or cause a point of inflection on aperiodic latencies.

3. The method of claim 1, wherein said aperiodic latency estimation inflection points are formed by binning said aperiodic data points using fluid flow analysis dependent only on the timeline defined by periodic traffic.

4. The method of claim 3, wherein said fluid flow analysis employs an algorithm.

5. A method for managing data flow in a system with simultaneous scheduling of aperiodic messages and periodic transmissions on a common bus, wherein data points of aperiodic message transmissions for the hyperperiod of interest in said system are collected, the method comprising:

using predefined periodic transmission times to calculate data transition points between busy and idle intervals for a hyperperiod of interest in said system;

using said data transition points to produce a series of aperiodic latency estimation inflection points;

estimating the aperiodic latency probability at an inflection point in the hyperperiod of interest as being equal to the number of sample data points less than or equal to the said inflection point divided by the total number of collected aperiodic latency sample data points, said data points forming a data point plot that is assumed to be linear between said aperiodic latency inflection points; and transmitting the aperiodic messages based, at least in part, on the estimated aperiodic latency probability.

6. The method of claim 5, wherein said data points are plotted on the X axis of a graph and the empirical probability that the latency exceeds the time is plotted m the Y axis of said graph, such that latency estimation inflection paints are selected along said X axis far the hyperperiod of interest to visually represent values at which higher priority periodic message traffic will impact or cause a point of inflection on aperiodic latencies.

7. The method of claim 5, wherein said aperiodic latency estimation inflection points are formed by binning said aperiodic data points using fluid flow analysis dependent only on the timeline defined by periodic traffic.

8. The method of claim 7, wherein said fluid flow analysis employs an algorithm.

9. A system with simultaneous scheduling of aperiodic messages and periodic transmissions, the system comprising:

a bus on which the periodic and aperiodic messages are transmitted; and a processor operable to use predefined periodic transmission times to calculate points indicating transitions between busy and idle intervals for a hyperperiod of interest in said system; the processor further operable to use said calculated points to produce a series of aperiodic latency estimation inflection points and to estimate the aperiodic latency probability at an inflection point in the hyperperiod of interest as being equal to the number of sample data points less than or equal to the said inflection point divided by the total number of collected aperiodic latency sample data points, said data points forming a data point plot that is assumed to be linear between said aperiodic latency estimation inflection points;

wherein the processor transmits the aperiodic messages on the bus based, at least in part, on the estimated aperiodic latency probability.

10. The system of claim 9, further comprising a display; wherein the processor outputs said data points to the display to be plotted on the X axis of a graph and the empirical probability that the latency exceeds the time is plotted on the Y axis of said graph, such that latency estimation inflection points are selected by the processor along said X axis for the hyperperiod of interest to visually represent values at which higher priority periodic message traffic will impact or cause a point of inflection on aperiodic latencies.

11. The system of claim 9, wherein the processor forms said aperiodic latency estimation inflection points by binning said aperiodic data points using fluid flow analysis dependent only on the timeline defined by periodic traffic.

* * * * *

UNITED STATES PATENT AND TRADEMARK OFFICE
CERTIFICATE OF CORRECTION

PATENT NO. : 7,590,063 B2 Page 1 of 1
APPLICATION NO. : 10/705802
DATED : September 15, 2009
INVENTOR(S) : Pamela A. Binns It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1697 days.

Signed and Sealed this

Twenty-first Day of September, 2010

David J. Kappos
*Director of the United States Patent and Trademark Office*